United States Patent [19]
Koyanagi et al.

[11] Patent Number: 6,078,150
[45] Date of Patent: Jun. 20, 2000

[54] LIGHT-EMITTING ELEMENT DRIVING CIRCUIT AND DEVICE USING THE SAME

[75] Inventors: Hisako Koyanagi; Hiroyuki Rokugawa, both of Kawasaki, Japan

[73] Assignee: Fujitsu Limited, Kawasaki, Japan

[21] Appl. No.: 09/035,859

[22] Filed: Mar. 6, 1998

[30] Foreign Application Priority Data

Oct. 15, 1997 [JP] Japan .................................. 9-281929

[51] Int. Cl.[7] ..................................................... H03K 5/08
[52] U.S. Cl. ........................ 315/309; 315/307; 315/169.3; 372/38
[58] Field of Search ................................. 315/168, 160, 315/163, 165, 169.1, 169.3, 309, 50, 307; 372/38; 359/183, 237; 350/3.7; 385/25, 33

[56] References Cited

U.S. PATENT DOCUMENTS

| | | | |
|---|---|---|---|
| 4,735,473 | 4/1988 | Migozzi et al. | 350/3.7 |
| 4,819,241 | 4/1989 | Nagano | 372/38 |
| 5,349,595 | 9/1994 | Ogawa et al. | 372/38 |
| 5,406,172 | 4/1995 | Bennett | 315/112 |
| 5,546,218 | 8/1996 | Komatsubara et al. | 359/237 |
| 5,835,250 | 11/1998 | Kanesaka | 359/183 |

FOREIGN PATENT DOCUMENTS 58-190085  5/1983  Japan ........................... H01S 3/096

*Primary Examiner*—Haissa Philogene
*Assistant Examiner*—Tuyet Vo
*Attorney, Agent, or Firm*—Staas & Halsey LLP

[57] ABSTRACT

A light-emitting element driving circuit includes a drive transistor having a first terminal receiving a power supply voltage, a second terminal coupled to an anode of a light-emitting element, and a control terminal receiving an input signal, the drive transistor supplying a pulse current and a first bias current to the light-emitting element. A constant-current source is coupled to the anode of the light-emitting element and supplies a second bias current to the light-emitting element. A compensation circuit controls the second bias current so that a variation in the first bias current due to a temperature variation can be compensated for thereby the sum of the first and second bias currents is kept constant.

13 Claims, 11 Drawing Sheets

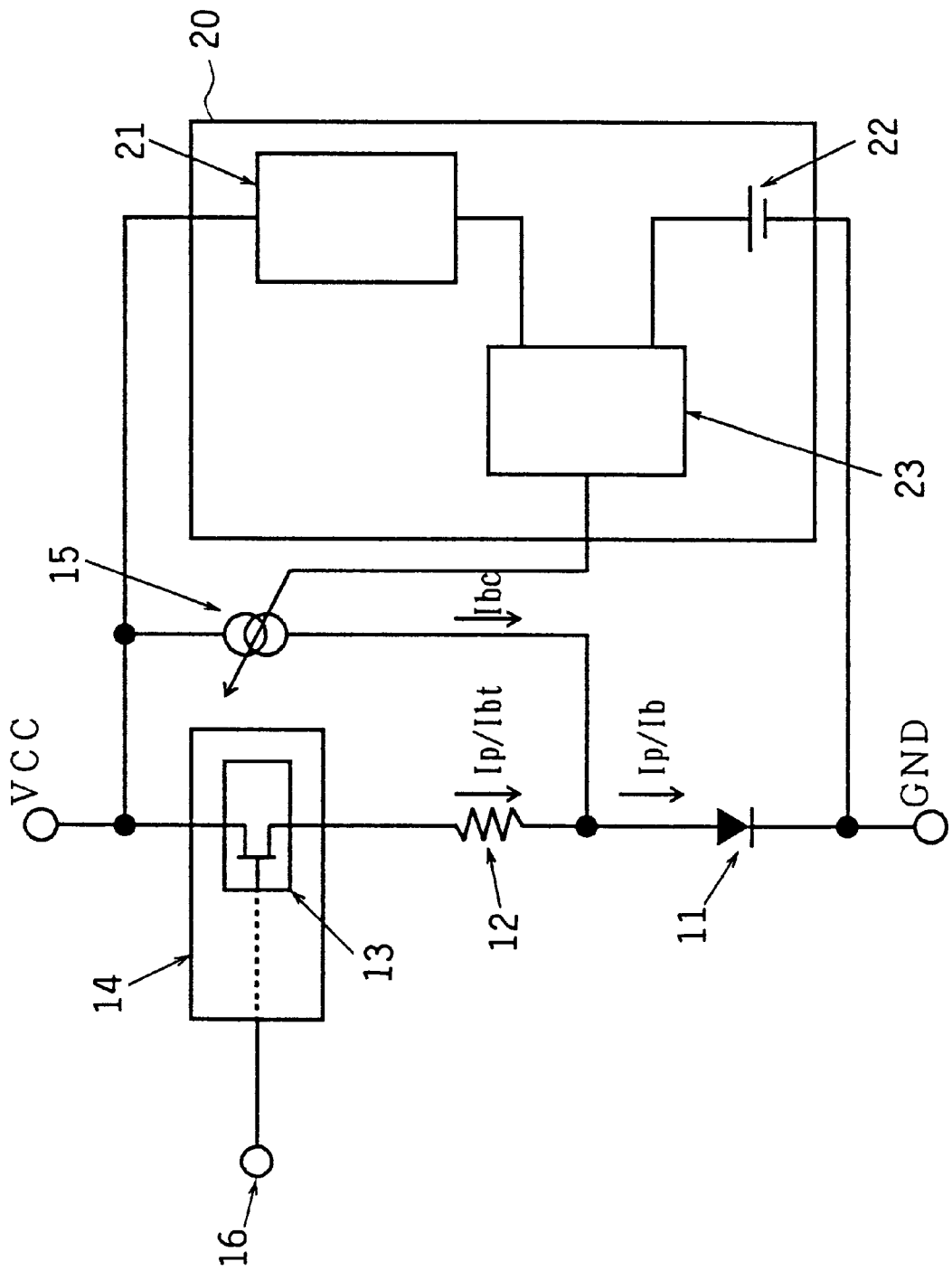

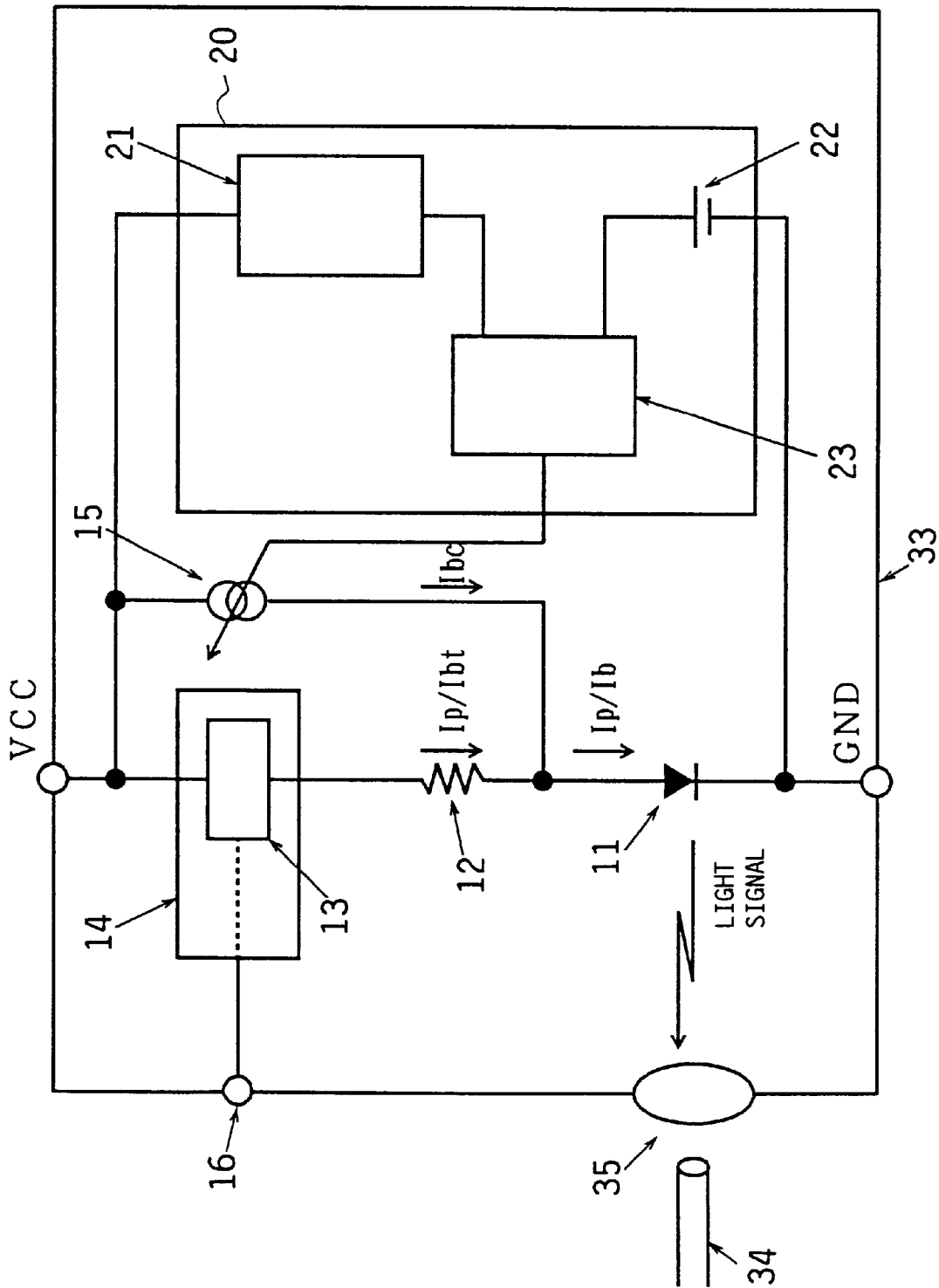

LIGHT-EMITTING ELEMENT DRIVING CIRCUIT AND DEVICE USING THE SAME

BACKGROUND OF THE INVENTION

1. Field of the Invention

The present invention relates to a light-emitting element driving circuit and a device using the same, and more particularly to a light-emitting element driving circuit which can operate at a high speed and can drive a light-emitting element directly by a logic circuit or by adding a simple circuit to a conventional circuit configuration.

Recently, there is a considerable activity in the developments of light-emitting elements such as semiconductor laser diodes. Such light-emitting elements are widely used and applied to, for example, optical communication systems and optical disk drives. For example, an optical repeater employs a semiconductor laser diode, which converts an electric signal into an optical signal. A light-emitting element driving circuit is used to drive the light-emitting element such as a semiconductor laser diode. More particularly, the light-emitting element driving circuit supplies the light-emitting element with a pulse current (which turns ON and OFF the element) and a bias current (which defines the magnitude of the output light of the element).

2. Description of the Related Art

The applicant proposed an improved light-emitting element driving circuit in related U.S. patent application Ser. No. 810,710 filed Mar. 3, 1997, the disclosure of which is hereby incorporated by reference. The improved circuit proposed in the Application was made in order to solve the problems of light-emitting element driving circuits of a current drawing type, which is unsuitable for a recent situation in which only a positive power supply is used to supply electricity with circuits. The proposed circuit has a configuration of a current supplying type. This will now be described with reference to FIG. 1.

FIG. 1 shows a light-emitting element driving circuit proposed in the above Application. The circuit is made up of a resistor 12, a constant-current source 15, a signal input terminal 16 and a logic circuit 14. The logic circuit 14 includes a drive transistor 13, and is, for example, MC100E416 produced by Motorola. An input signal which controls the light-emitting element 11 is applied to a control terminal (gate) of the drive transistor 13 via the input terminal 16. The drive transistor 13 converts the voltage of the input signal into a current, which flows in the light-emitting element 11. The above current includes a pulse current Ip and a first bias current Ibt. The resistor 12 adjusts the pulse current Ip and the first bias current Ibt. The constant-current source 15 is provided on the anode side of the light-emitting element 11, and supplies a second bias current Ibc thereto.

The light output of the light-emitting element 11 depends on the total bias current Ic which corresponds to the sum of the first and second bias currents Ibt and Ibc (Ic=Ibc+Ibt). The light-emitting element 11 is turned ON and OFF on the basis of the pulse current Ip dependent on the input signal.

In the circuit shown in FIG. 1, the bias current Ib is mainly supplied from the constant-current source 15 and is also supplied from a pulse current supply part made up of the resistor 12 and the drive transistor 13. The bias current Ib supplied to the light-emitting element 11 is defined as follows:

$$Ib = Ibc + Ibt \quad (1)$$

$$= Ibc + (Vout(L) - \phi_{LD})/R_{LD} \quad (2)$$

where Vout(L) denotes the low-level output of the logic circuit 14, $\phi_{LD}$ denotes a built-in voltage of the light-emitting element 11, and $R_{LD}$ denotes a resistance value of the resistor 12.

The light output Pout of the light-emitting element 11 is generally expressed as follows:

$$Pout = (Ip + Ib - Ith) * \delta \quad (3)$$

where Ith denotes the threshold current of the light-emitting element 11, and $\delta$ denotes the differential quantization efficiency.

There are two disadvantages to be solved.

If the power supply voltage VCC is varied, the low-level output Vout(L) will be varied and thus the light output will be varied. Hence, there is a very limited variation range of the power supply voltage VCC in which the suitable light output can be obtained. Thus, the light-emitting element driving circuit shown in FIG. 1 can be used in restricted applications. The above is the first disadvantage.

The above equation (2) does not have any term dependent on temperature. Hence, the bias current Ib is substantially constant irrespective of temperature variations. However, if a light-emitting element has the threshold voltage Ith or the differential quantization efficiency $\delta$ depending on temperature, the light output of the element will be varied due to temperature variations irrespective of whether the bias current Ib is constant. Hence, such a light-emitting element is applied to very restricted environments which do not require stability of the element with respect to temperature variations. The above is the second disadvantage.

SUMMARY OF THE INVENTION

It is a general object of the present invention to provide a light-emitting element driving circuit in which the above disadvantages are eliminated.

A more specific object of the present invention is to provide a light-emitting element driving circuit capable of supplying a bias current which is substantially immune to variations in the power supply voltage and thus providing a stable light output.

Another object of the present invention is to provide a light-emitting element driving circuit capable of providing a stable output which is substantially immune to temperature variations.

The above objects of the present invention are achieved by a light-emitting element driving circuit comprising: a drive transistor having a first terminal receiving a power supply voltage, a second terminal coupled to an anode of a light-emitting element, and a control terminal receiving an input signal, the drive transistor supplying a pulse current and a first bias current to the light-emitting element; a constant-current source that is coupled to the anode of the light-emitting element and supplies a second bias current to the light-emitting element; and a compensation circuit which controls the second bias current so that a variation in the first bias current due to a temperature variation can be compensated for thereby the sum of the first and second bias currents is kept constant.

The above light-emitting element driving circuit may be configured so that the constant-current source comprises a circuit part that varies the second bias current under control of the compensation circuit.

The light-emitting element driving circuit may be configured so that the constant-current source comprises a variable resistor that varies the second bias current under control of the compensation circuit.

The light-emitting element driving circuit may be configured so that the constant-current source has a performance which decreases or increases the second bias current in response to a temperature increase or decrease under control of the compensation circuit.

The light-emitting element driving circuit may be configured so that the constant-current source comprises a thermistor which decreases or increases the second bias current in response to a temperature increase or decrease under control of the compensation circuit.

The light-emitting element driving circuit may be configured so that the constant-current source comprises a sensor which produces a voltage dependent on the temperature, the voltage decreasing or increasing the second bias current in response to a temperature increase or decrease under control of the compensation circuit.

The light-emitting element driving circuit may be configured so that the compensation circuit comprises: a detection circuit that detects a variation in the power supply voltage; a reference voltage source generating a reference voltage; and a current adjusting circuit which controls the second bias current on the basis of a relationship between the variation in the power supply voltage and the reference voltage.

The light-emitting element driving circuit may be configured so that the reference voltage source comprises a Zener diode.

The light-emitting element driving circuit may be configured so that the reference voltage source comprises a circuit part which changes the reference voltage.

The light-emitting element driving circuit may be configured so that the reference voltage source comprises a variable Zener diode and a thermistor which defines a Zener voltage of the variable Zener diode, the Zener voltage corresponding to the reference voltage.

The light-emitting element driving circuit may be configured so that the reference voltage source comprises a circuit which produces the reference voltage based on the temperature.

The light-emitting element driving circuit may be configured so that the drive transistor is a field effect transistor.

A further object of the present invention is provide a device using a light-emitting element driving circuit as described above.

The above object of the present invention is achieved by a light-emitting device comprising: a light-emitting element; a signal input terminal receiving an input signal; a light-emitting element driving circuit which drives the light-emitting element; and an output part which outputs light emitted from the light-emitting element to an outside of the light-emitting device, the light-emitting element comprising: a drive transistor having a first terminal receiving a power supply voltage, a second terminal coupled to an anode of the light-emitting element, and a control terminal receiving the input signal via the input terminal, the drive transistor supplying a pulse current and a first bias current to the light-emitting element; a constant-current source that is coupled to the anode of the light-emitting element and supplies a second bias current to the light-emitting element; and a compensation circuit which controls the second bias current so that a variation in the first bias current due to a temperature variation can be compensated for thereby the sum of the first and second bias currents is kept constant.

BRIEF DESCRIPTION OF THE DRAWINGS

Other objects, features and advantages of the present invention will become more apparent from the following detailed description when read in conjunction with the accompanying drawings, in which:

FIG. 10 is a circuit diagram of a configuration in which a drive transistor is formed of a field effect transistor; and FIG. 11 is a circuit diagram of a light-emitting device which employs the light-emitting element driving circuit according to the present invention.

DESCRIPTION OF THE PREFERRED EMBODIMENTS

Figure 1:
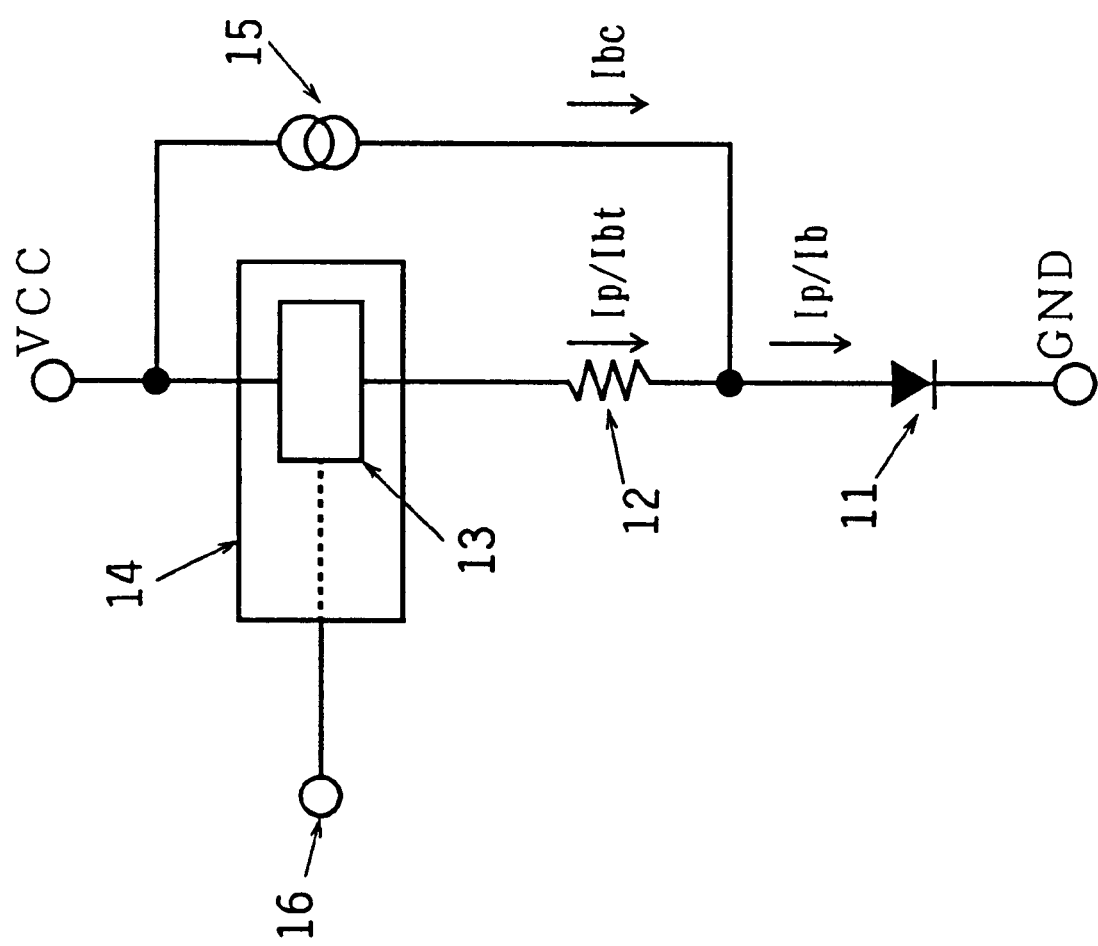
FIG. 1 is a circuit diagram of a light-emitting element driving circuit related to the present invention.
Figure 2:
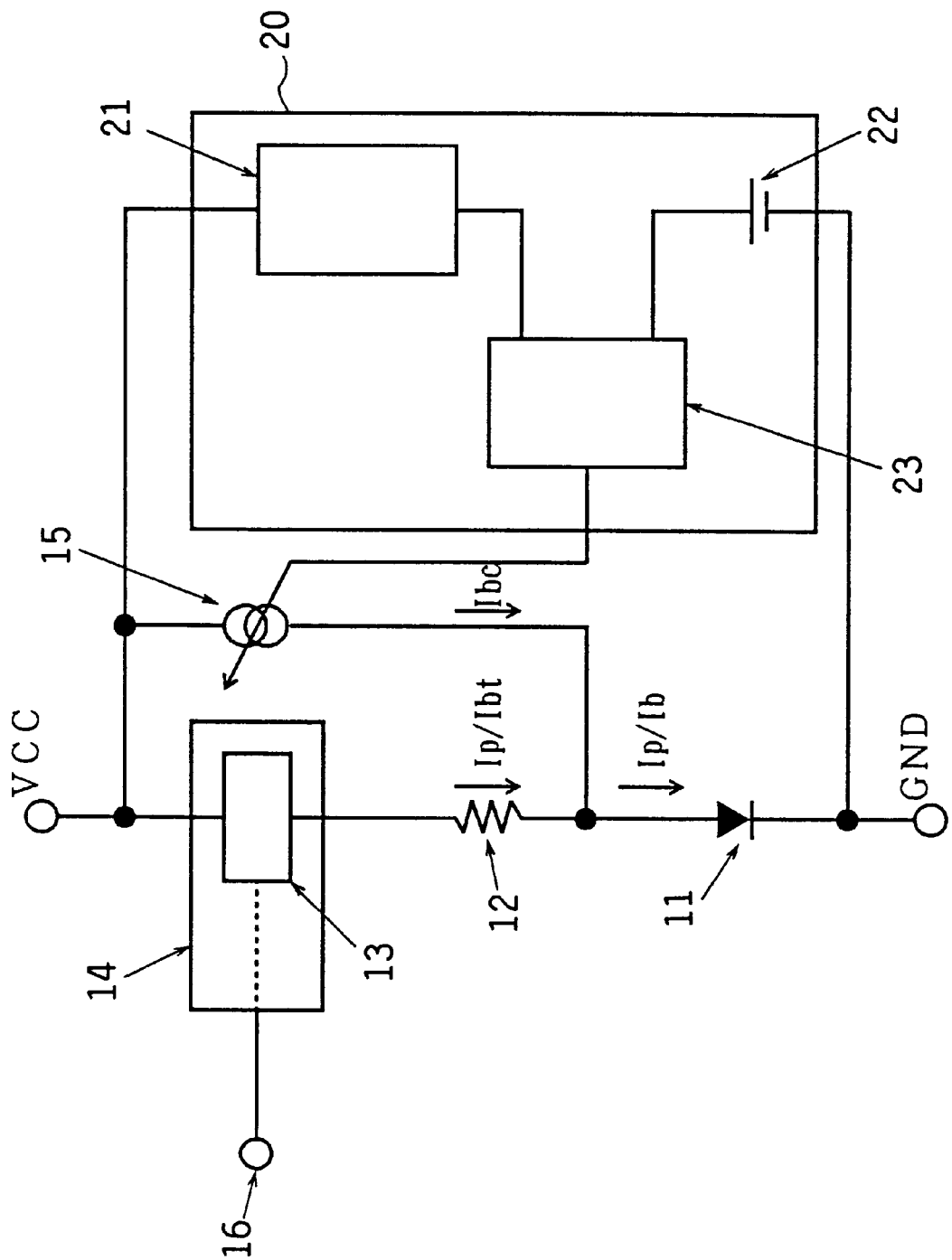
FIG. 2 is a a circuit diagram showing the principle of the present invention.

FIG. 2 is a circuit diagram showing the principle of the present invention, in which parts that are the same as those shown in FIG. 1 are given the same reference numbers.

A compensation circuit 20 is provided to the circuit configuration shown in FIG. 1 so that the constant-current source 15 is controlled by the compensation circuit 20. As shown in FIG. 2, the compensation circuit 20 includes a power supply voltage variation detecting circuit 21, a reference voltage source 22 and a current adjusting circuit 23. The current adjusting circuit 23 has an output signal which adjusts the magnitude of the constant current of the constant-current source 15.

If the power supply voltage VCC varies which is applied to the drive transistor 13 and the constant-current source 15, the first bias current Ibt from the driver transistor 13 is varied. The current adjusting circuit 23 of the compensation circuit 20 adjusts the second bias current Ibc from the constant-current source 15 so that the bias current flowing in the light-emitting element 11 is constant.

The power supply voltage variation detecting circuit 21 detects variation in the power supply voltage VCC. If the power supply voltage VCC is increased, the current adjustment circuit 23 adjusts the constant-current source 15 by referring to a reference voltage of the reference voltage source 22 so that the bias current Ibc is reduced. When a variation in the bias current Ibc is denoted by $\Delta Ibc$, and a variation in the bias current Ibt is denoted by $\Delta Ibt$, the compensated bias current Ib is expressed as follows:

$$Ib = Ibc + \Delta Ibc + Ibt + \Delta Ibt.$$

By adjusting the constant-current source 15 so that $\Delta Ibc$ is equal to $-\Delta Ibt$, it is possible to obtain the constant bias current Ib even when the power supply voltage VCC is varied. Hence, the light-emitting element 11 can stably emit the light output even when the power supply voltage VCC is varied.

When the driver transistor 13 is formed of a field effect transistor as shown in FIG. 10, the light-emitting element driving circuit can operate at a higher speed than that obtained when a bipolar transistor is used.

Figure 3:
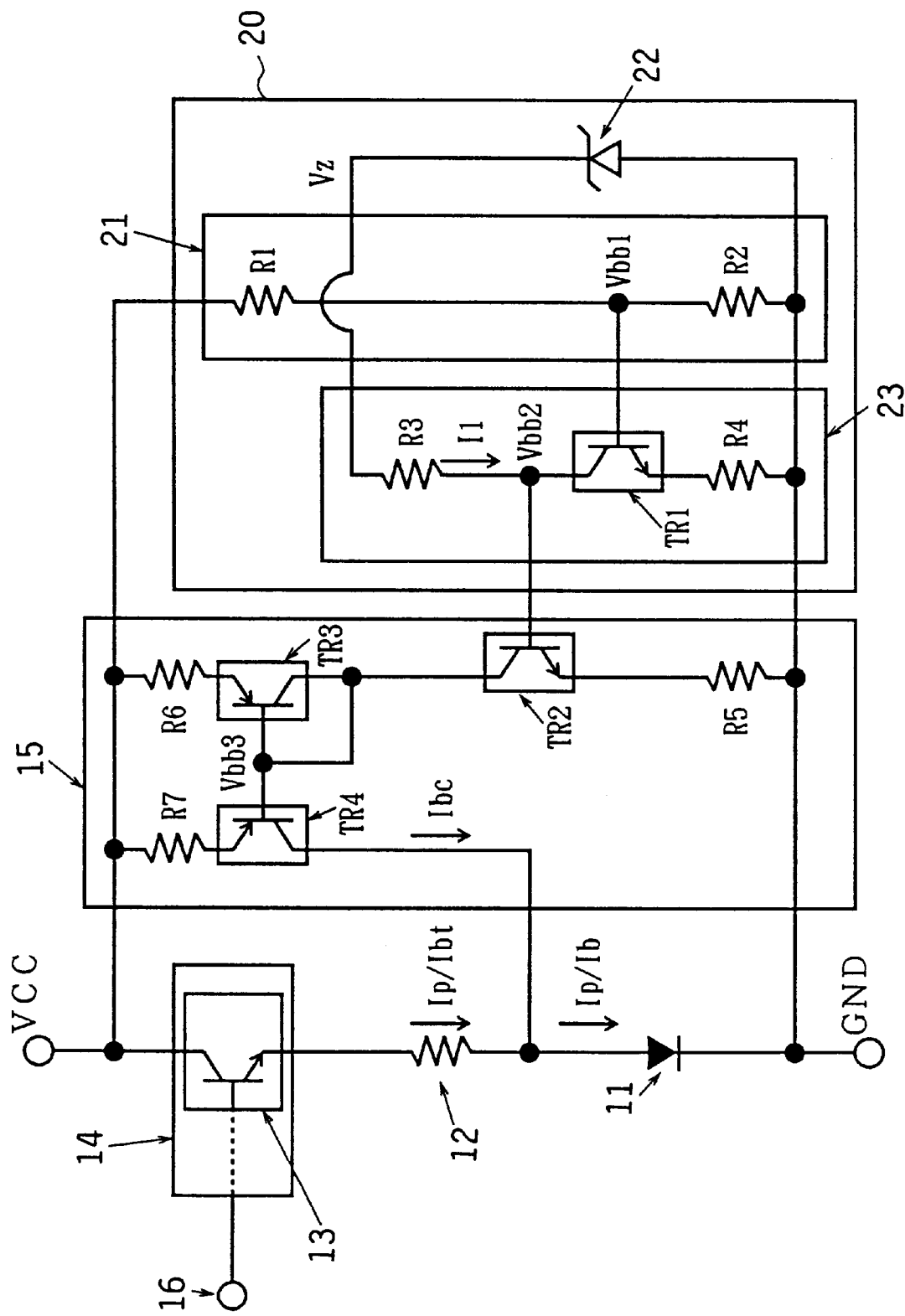
FIG. 3 is a circuit diagram of an embodiment of the present invention.

FIG. 3 is a circuit diagram of a first embodiment of the present invention in which parts that are the same as those shown in FIG. 2 are given the same reference numbers. The constant-current source 15 is made up of transistors TR2, TR3 and TR4, and resistors R5, R6 and R7. The power supply voltage variation detecting circuit 21 includes resistors R1 and R2. The reference voltage source 22 is formed of a Zener diode and defines a reference voltage Vz. The current adjusting circuit 23 includes resistors R3 and R4 and a transistor TR1, and controls the second bias current Ib on the basis of a relationship between the detected variation in the power supply voltage VCC and the reference voltage Vz.

An input signal is applied to the signal input terminal 16, and the pulse current Ip and the first bias current Ibt based on the input signal are output from the drive transistor 13. The pulse current Ip turns ON and OFF the light-emitting element 11, which outputs the optical signal based on the input signal. The output of the light-emitting element 11 depends on the bias current Ib (=Ibt+Ibc) applied to the light-emitting element 11.

If the power supply voltage VCC is increased, the first bias current Ibt from the drive transistor 13 is increased by $\Delta Ibt$. The base potential Vbb1 of the transistor TR1 of the circuit 21 is increased, and thus the collector current I1 of the transistor TR1 is increased, while the collector potential Vbb2 (=Vz−R3*I1) of the transistor TR1 is decreased. Hence, the base potential of the transistor TR2 is decreased, and the base potential Vbb3 of the transistor TR4 is increased. Hence, the second bias current Ibc is reduced by $\Delta Ibc$. When the current control is performed so that $\Delta Ibc$ is equal to $\Delta Ibt$, the constant bias current Ib immune to an increase of the power supply voltage VCC can be obtained. Thus, the light-emitting element 11 is controlled to emit the constant light output.

If the power supply voltage VCC is decreased, the first bias current Ibt from the drive transistor 13 is reduced by $\Delta Ibt'$. The base potential Vbb1 of the transistor TR1 of the power supply voltage variation detecting circuit 21 is decreased and the collector current I1 thereof is reduced. Thus, the collector potential Vbb2 of the transistor TR1 is increased. Then, the base potential of the transistor TR2 is increased and the base potential Vbb3 of the transistor TR4 is decreased. Hence, the second bias current Ibc from the constant-current source 15 is increased by $\Delta Ibc'$. When the current control is performed so that $\Delta Ibc'$ is equal to $\Delta Ibt'$, the constant bias current Ib immune to a decrease of the power supply voltage VCC can be obtained. Thus, the light-emitting element 11 is controlled to emit the constant light output.

It is required that a semiconductor laser diode which is used as the light-emitting element 11 be supplied with a dc bias current based on an oscillation threshold current of the diode. In practice, individual semiconductor laser diodes have different oscillation threshold currents. Hence, it is necessary to adjust the bias current for each semiconductor laser diode.

Figure 4:
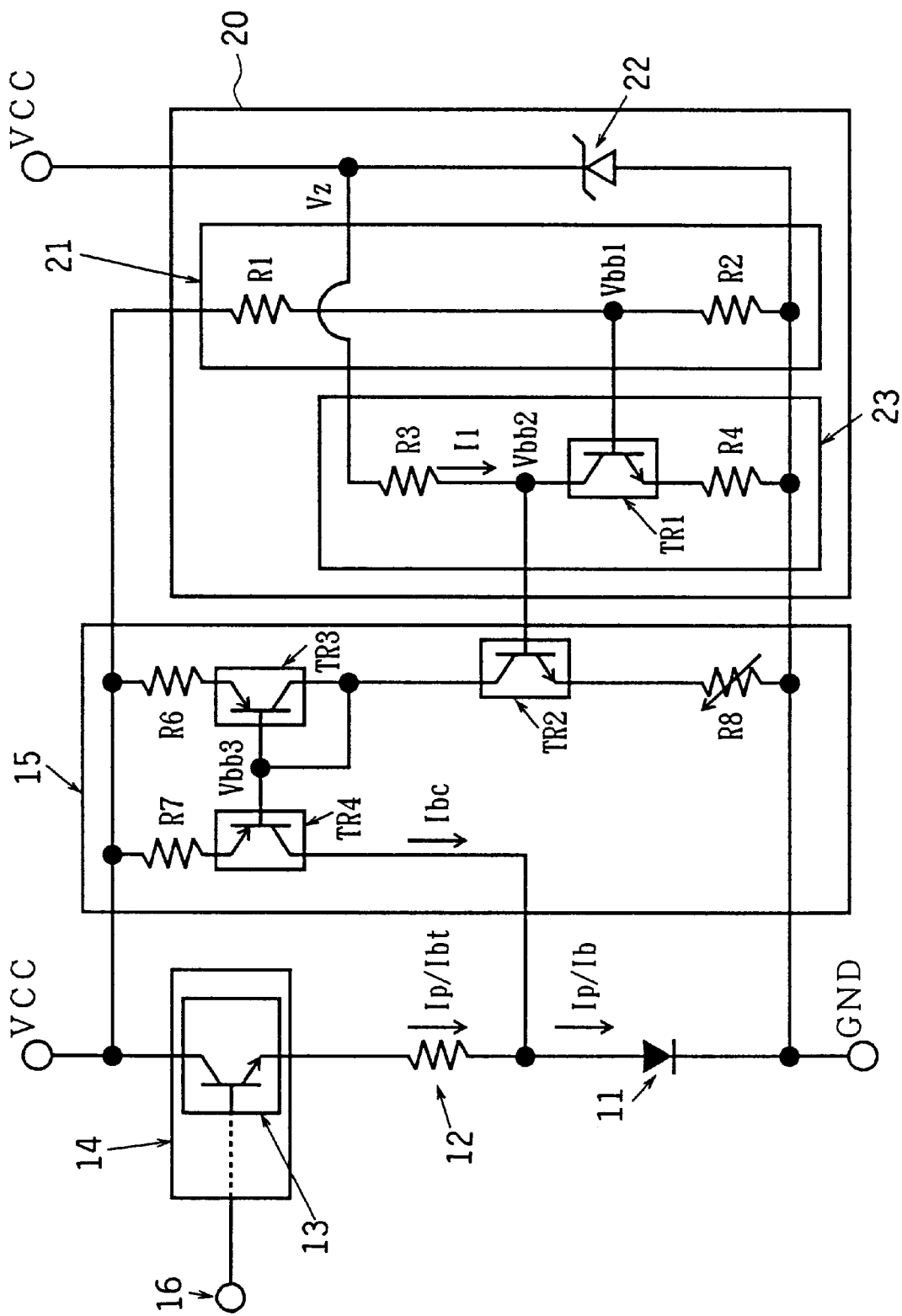
FIG. 4 is a circuit diagram a variation of the circuit configuration shown in FIG. 3, in which a variable resistance is used in a constant-current source.

With the above in mind, the resistor R5 is replaced by a variable resistor R8 shown in FIG. 4. By adjusting the resistance of the variable resistor R8, it is possible to define the bias current Ib suitable for the performance of the light-emitting element 11. More particularly, the base potential Vbb3 of the transistor TR4 is defined by dividing the power supply voltage VCC by the resistors R6 and R8. The voltage dividing ratio can be changed by adjusting the resistance of the variable resistor R8. Thus, the base potential Vbb3 of the transistor TR4 can be changed, and then the second bias current Ibc from the transistor TR4 can be changed. For example, when the second bias current Ibc is reduced so as to match the oscillation threshold current of the light-emitting element 11, the variable resistor R8 is controlled to have an increased resistance value. Hence, the base potential Vbb3 of the transistor TR4 is increased, and thus the bias current Ibc of the transistor TR4 is reduced. As described above, it is possible to supply the second bias current to the light-emitting element 11 suitable for the performance of the light-emitting element 11. Alternatively, the resistor R6 or R7 can be replaced by a variable resistor so that the bias current Ib suitable for the performance of the light-emitting element 11 can be defined.

Figure 7:
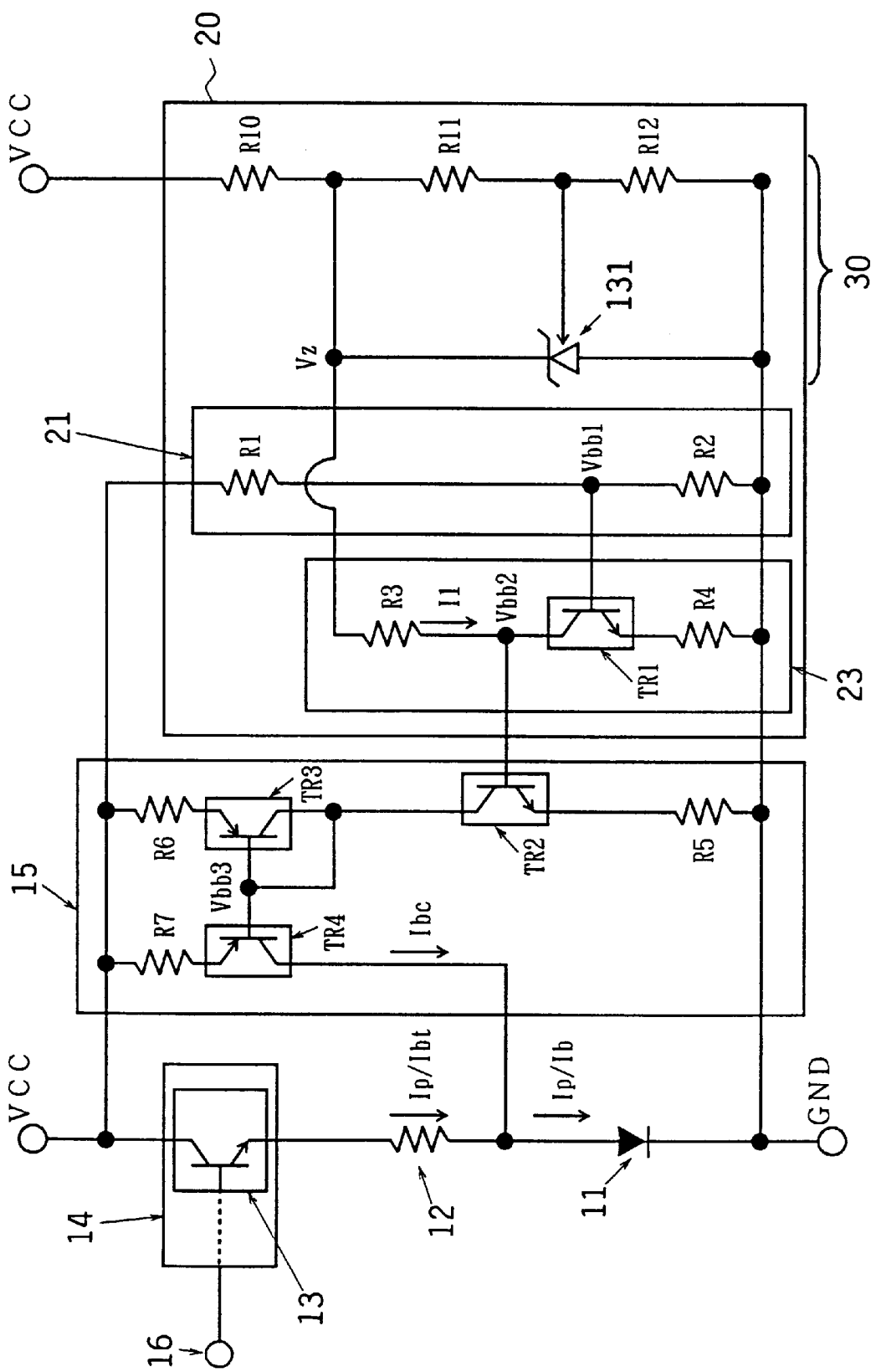
FIG. 7 is a circuit diagram of a further variation of the circuit configuration shown in FIG. 3, in which a variable Zener diode is used in a compensation circuit.

A circuit shown in FIG. 7 can be used in order to define the bias current Ib suitable for the performance of the light-emitting element 11. A variable Zener diode 31 is substituted for the Zener diode 22. For example, when the second bias current Ibc is reduced to be suitable for the performance of the light-emitting element 11, the variable Zener diode 31 is controlled to reduce the Zener voltage VZ. When the Zener voltage VZ is reduced, the collector voltage Vbb2 of the transistor TR1 is reduced, and the base potential Vbb3 of the transistor TR4 is increased. Hence, the second bias current Ibc of the transistor TR4 is reduced.

Figure 5:
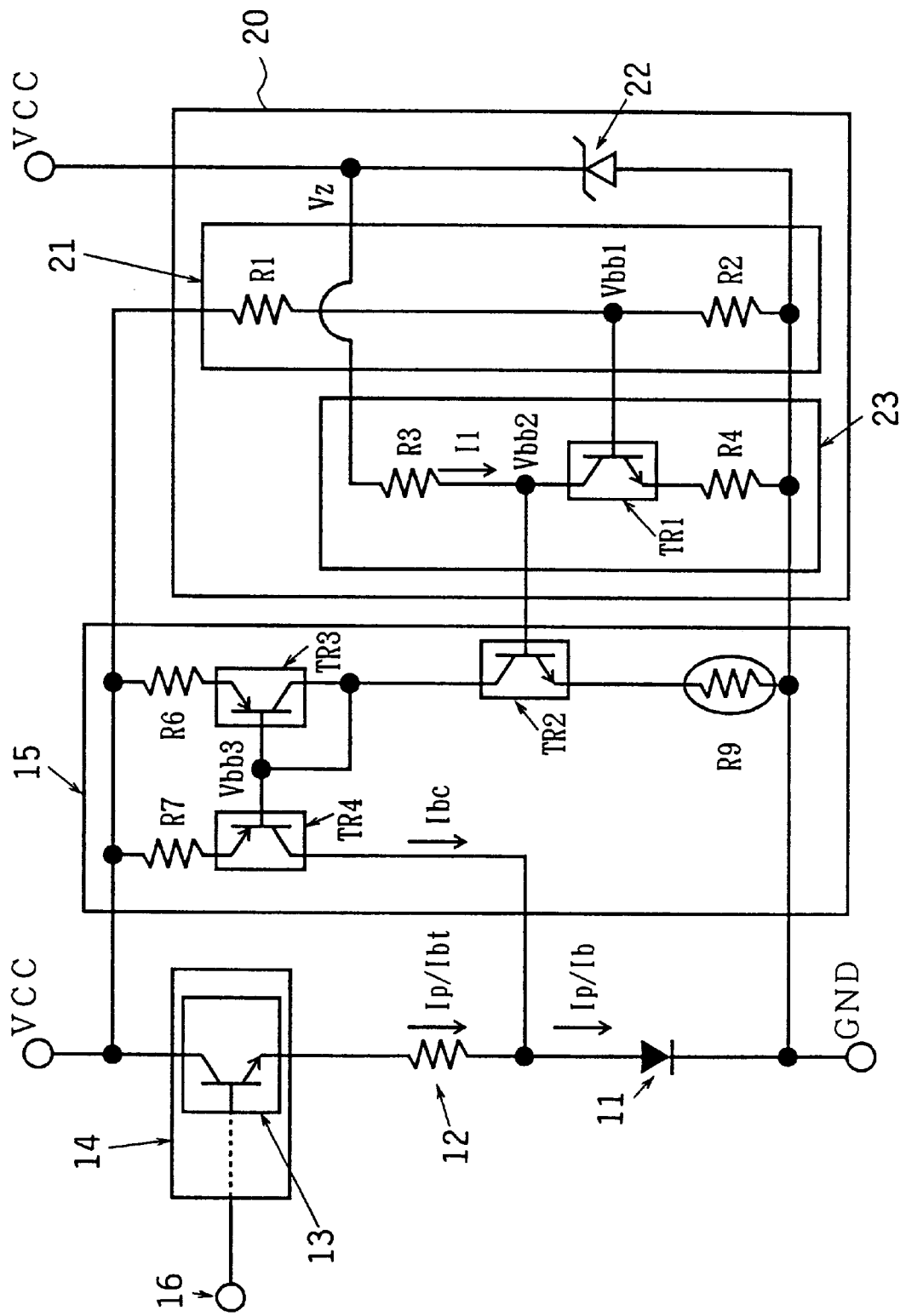
FIG. 5 is a circuit diagram of another variation of the circuit configuration shown in FIG. 3, in which a thermistor is used in the constant-current source.

A circuit configuration shown in FIG. 5 employs a thermistor R9 which is substituted for the resistor R5 shown in FIG. 3. The second bias current Ibc is reduced or increased in response to a temperature increase or decrease. Hence, the light-emitting element 11 is not greatly affected by temperature variations. If the light-emitting element 11 has the threshold current Ith or the differential quantization efficiency δ that depends on temperature, the light output will be varied due to temperature variations even when the bias current Ib is regulated at a constant level. This has been described previously. Generally, a temperature increase increases the light output of the light-emitting element 11.

The thermistor R9 has a characteristic in which its resistance value is increased in response to a temperature increase. In other words, the thermistor R9 has a positive temperature coefficient. Hence, if the temperature rises, the thermistor R9 has an increased resistance value, and then the base potential Vbb3 of the transistor TR4 is increased. Thus, the second bias current Ibc from the transistor TR4 is reduced and the light output of the light-emitting element 11 is reduced. Hence, an increase in the light output due to a temperature increase can be avoided.

The resistor R6 shown in FIG. 3 can be replaced by a thermistor having a negative temperature coefficient. Alternatively, the resistor R7 can be replaced by a thermistor having a positive temperature coefficient. It is also possible to provide a resistor or a variable resistor connected to the thermistor (R9, R6, R7) in order to increase the degree of freedom in adjustment of the second bias current Ibc with respect to the performance or temperature characteristic of the light-emitting element 11.

Figure 6:
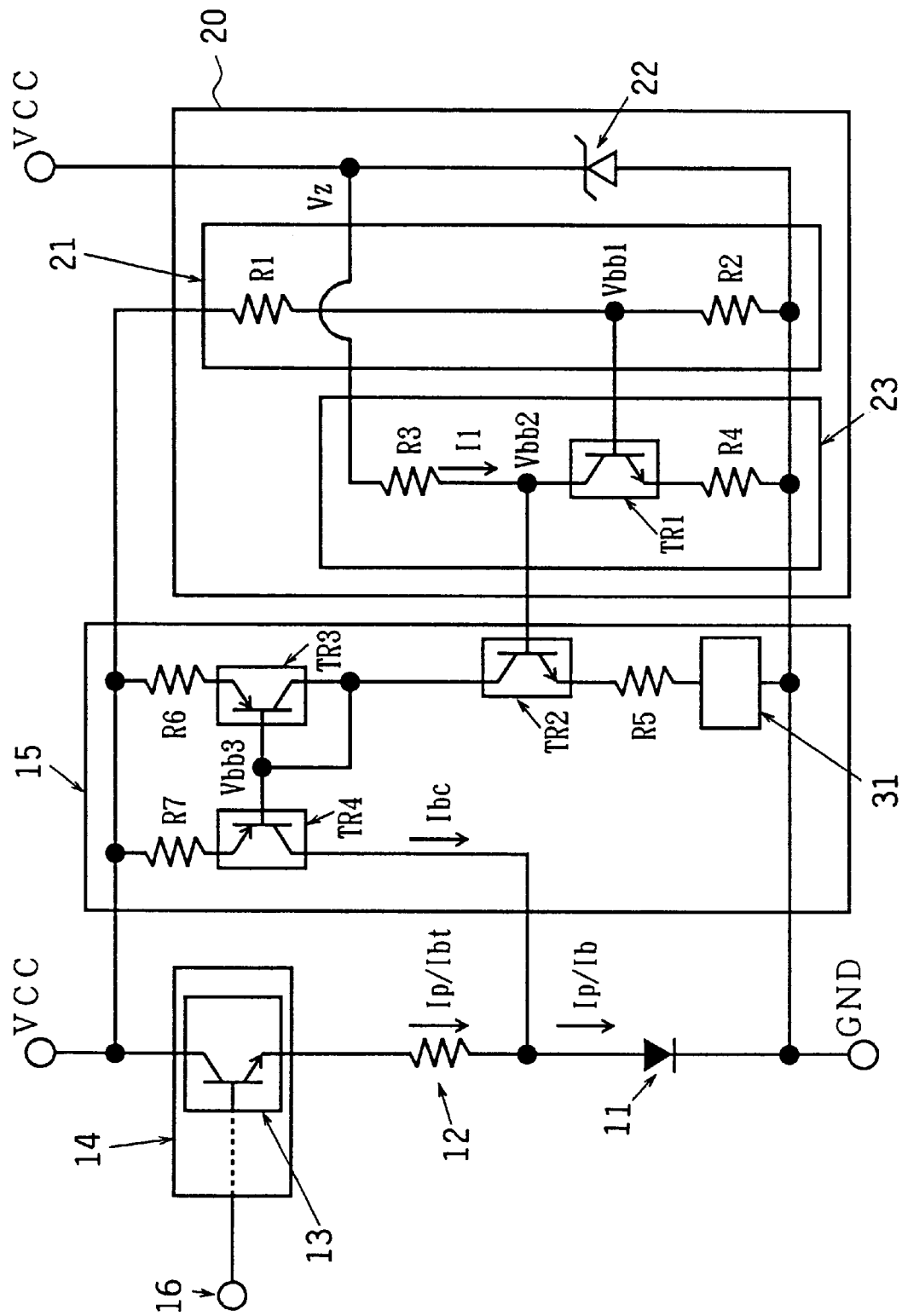
FIG. 6 is a circuit diagram of yet another variation of the circuit configuration shown in FIG. 3, in which a temperature sensor IC is used in the constant-current source.

The thermistor can be replaced by a circuit which generates a voltage dependent on temperature. Such a circuit is, for example, a power output type temperature sensor IC. FIG. 6 shows a circuit configuration which employs a power output type temperature sensor IC 31 is externally supplied with electricity and has an internal circuit which senses the temperature and produces an electric signal dependent on the sensed temperature. The above power output type temperature sensor IC is known and available in the market.

When the temperature rises, the output potential of the sensor IC 31 is increased. Then, the base potential Vbb3 of the transistor TR4 is increased, and the second bias current Ib of the transistor TR4 is reduced. Thus, the light output of the light-emitting element 11 is reduced, so that an increase of the light output caused by a temperature increase can be prevented.

FIG. 7 shows a circuit configuration in which a variable Zener diode 131 is used to define the reference voltage which is the Zener voltage Vz. The Zener voltage Vz is defined by resistors R11 and R12 connected in series. A node at which the resistors R11 and R12 are connected is connected to a control terminal of the variable Zener diode 131. The second bias current Ibc is decreased or increased in response to a temperature increase or decrease, so that the stable light output of the light-emitting element 11 can be obtained in a wide temperature range even if the element 11 has a temperature dependence.

Figure 8:
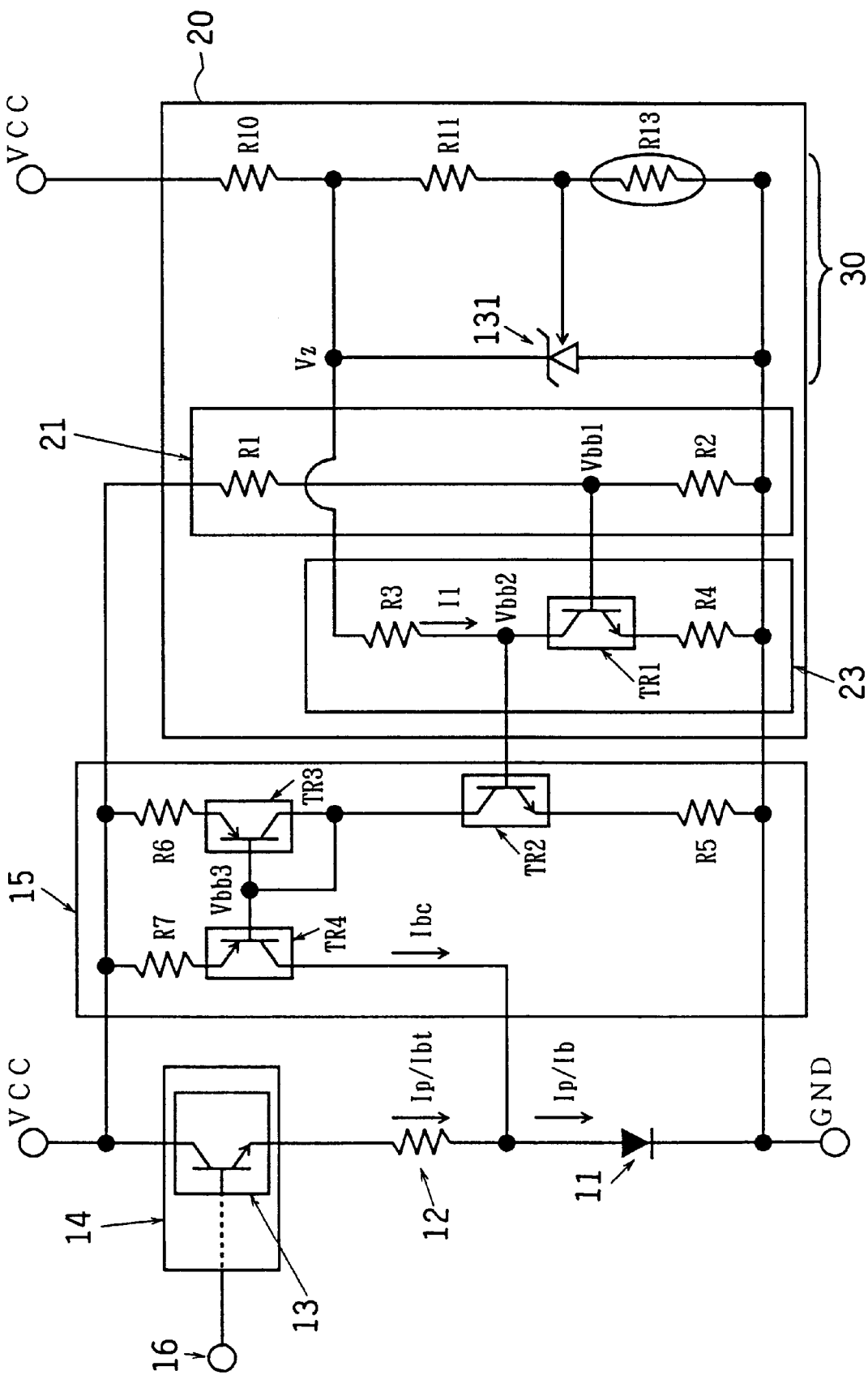
FIG. 8 is a circuit diagram of a variation of the circuit configuration shown in FIG. 7, in which a thermistor is used.

A thermistor R13, shown in FIG. 8, is used in a circuit which defines the Zener voltage VZ of the variable Zener diode 131. When the temperature rises, the resistance of the thermistor R13 is changed so as to reduce the Zener voltage VZ. When the Zener voltage VZ is decreased, the collector potential Vbb2 of the transistor TR1 is decreased, and then the collector potential of the transistor TR2 is increased. Further, the base potential Vbb3 of the transistor TR4 is increased. Hence, the second bias current Ibc of the transistor TR4 is reduced and the light output of the light-emitting element 11 is reduced. Hence, an increase of the light output due to a temperature increase can be suppressed. A resistor or a variable resistor can be provided so that it is connected to the thermistor R13 in series in order to increase the degree of freedom in adjustment of the second bias current Ibc with respect to the performance or temperature characteristic of the light-emitting element 11.

Figure 9:
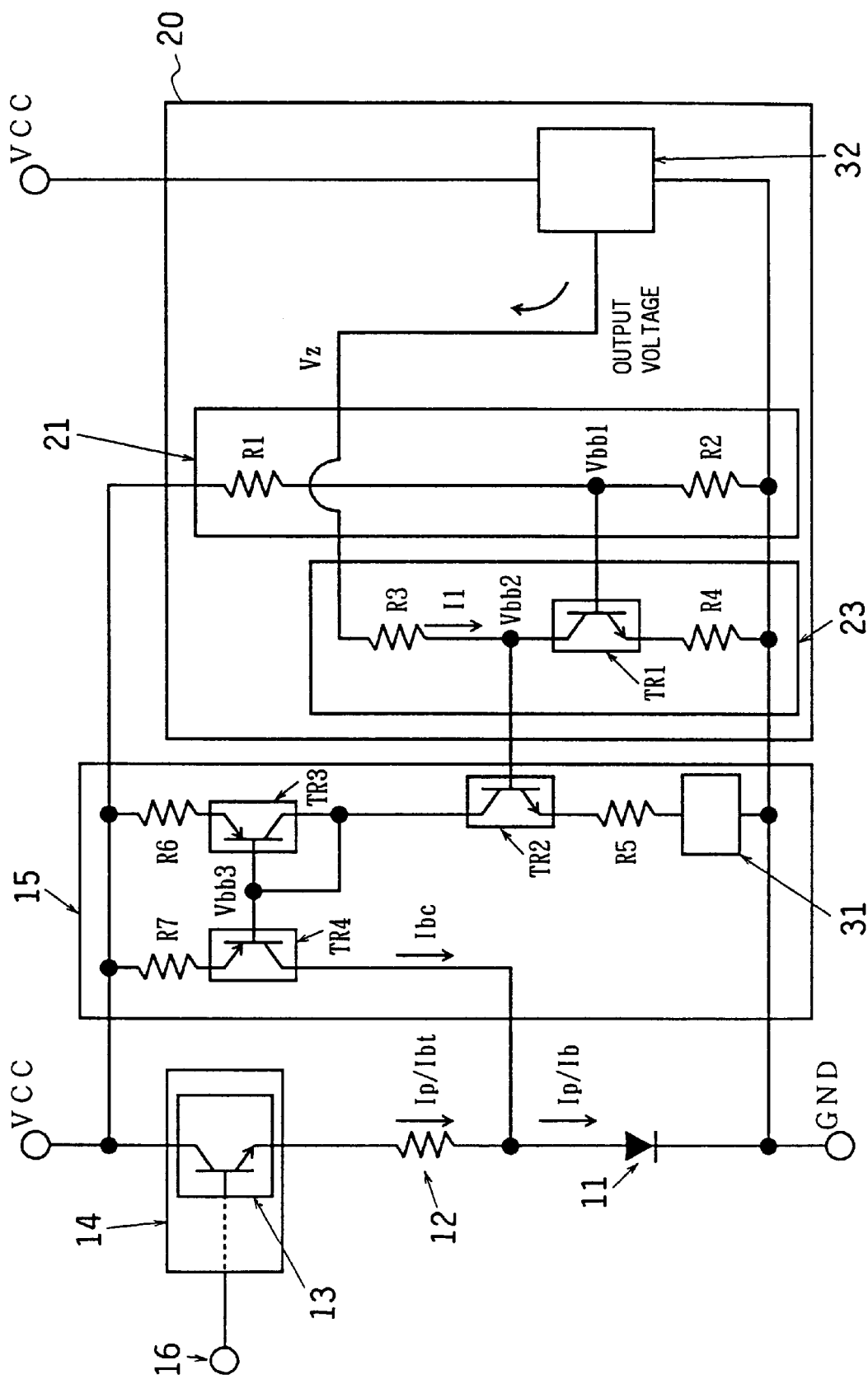
FIG. 9 is a circuit diagram of a variation of the circuit configuration shown in FIG. 3, in which a power output type temperature sensor is used in the compensation circuit.

Referring to FIG. 9, a circuit 32 which produces a voltage depending on temperature is used to form the reference voltage source 30. The circuit 32 is, for example, a power output type temperature sensor IC. When the temperature rises, the sensor IC 32 produces a reduced output voltage. The second bias current Ibc is decreased or increased in response to a temperature increase or decrease, so that the stable light output of the light-emitting element 11 can be obtained in a wide temperature range even if the element 11 has a temperature dependence.

When the temperature rises, the output potential of the temperature sensor IC 32 is decreased, and thus the collector potential Vbb2 of the transistor TR1 is decreased. Then, the collector potential of the transistor TR2 is increased, and the base potential Vbb3 of the transistor TR4 is increased. As a result, the second bias current Ibc from the transistor TR4 is reduced and the light output of the light-emitting element is reduced. Hence, an increase in the light output due to a temperature increased can be suppressed.

FIG. 11 is a light-emitting device using the light-emitting element driving circuit as described above. An optical fiber cable 34 is coupled to the light-emitting device via an output interface 35. The light emitted from the light-emitting element 11 is input to the optical fiber cable 34.

The present invention can make it possible for the light-emitting element to stably emit light even if the power supply voltage and/or the temperature varies. Hence, the present invention can be applied to environments in which the power supply voltage and/or the temperature varies.

The present invention is not limited to the specifically disclosed embodiments, and variations and modifications may be made without departing from the scope of the present invention.

What is claimed is:

1. A light-emitting element driving circuit comprising:
   a drive transistor having a first terminal receiving a power supply voltage, a second terminal coupled to an anode of a light-emitting element, and a control terminal receiving an input signal, said drive transistor supplying a pulse current and a first bias current to the light-emitting element;
   a constant-current source coupled to the anode of the light-emitting element and supplying a second bias current to the light-emitting element; and
   a compensation circuit controlling the second bias current to compensate for a variation in the first bias current due to a temperature variation, whereby the sum of the first and second bias currents is kept constant.

2. The light-emitting element driving circuit as claimed in claim 1, wherein said constant-current source comprises a circuit part varying the second bias current under control of said compensation circuit.

3. The light-emitting element driving circuit as claimed in claim 1, wherein said constant-current source comprises a variable resistor varying the second bias current under control of said compensation circuit.

4. The light-emitting element driving circuit as claimed in claim 1, wherein said constant-current source decreases or increases the second bias current in response to a temperature increase or decrease under control of said compensation circuit.

5. The light-emitting element driving circuit as claimed in claim 1, wherein said constant-current source comprises a thermistor decreasing or increasing the second bias current in response to a temperature increase or decrease under control of said compensation circuit.

6. The light-emitting element driving circuit as claimed in claim 1, wherein said constant-current source comprises a sensor producing a voltage dependent on a temperature, the voltage decreasing or increasing the second bias current in response to a temperature increase or decrease under control of said compensation circuit.

7. The light-emitting element driving circuit as claimed in claim 1, wherein said compensation circuit comprises:
   a detection circuit detecting a variation in the power supply voltage;
   a reference voltage source generating a reference voltage; and
   a current adjusting circuit controlling the second bias current based on a relationship between the variation in the power supply voltage and the reference voltage.

8. The light-emitting element driving circuit as claimed in claim 7, wherein the reference voltage source comprises a Zener diode.

9. The light-emitting element driving circuit as claimed in claim 7, wherein the reference voltage source comprises a circuit part changing the reference voltage.

10. The light-emitting element driving circuit as claimed in claim 7, wherein the reference voltage source comprises a variable Zener diode and a thermistor defining a Zener voltage of the variable Zener diode, the Zener voltage corresponding to the reference voltage.

11. The light-emitting element driving circuit as claimed in claim 7, wherein the reference voltage source comprises a circuit producing the reference voltage based on a temperature.

12. The light-emitting element driving circuit as claimed in claim 1, wherein said drive transistor is a field effect transistor.

13. A light-emitting device comprising:

a light-emitting element;

a signal input terminal receiving an input signal;

a light-emitting element driving circuit coupled to said signal input terminal and driving said light-emitting element; and an output part outputting light emitted by said light-emitting element from said light-emitting device;

wherein said light-emitting element driving circuit comprises:

a drive transistor having a first terminal receiving a power supply voltage, a second terminal coupled to an anode of said light-emitting element, and a control terminal receiving the input signal via said signal input terminal, the drive transistor supplying a pulse current and a first bias current to said light-emitting element;

a constant-current source coupled to the anode of said light-emitting element and supplying a second bias current to said light-emitting element; and a compensation circuit controlling the second bias current to compensate for a variation in the first bias current due to a temperature variation, whereby the sum of the first and second bias currents is kept constant.

* * * * *

UNITED STATES PATENT AND TRADEMARK OFFICE
CERTIFICATE OF CORRECTION

PATENT NO. : 6,078,150
DATED : June 20, 2000
INVENTOR(S) : Hisako Koyanagi et al.

Page 1 of 1

It is certified that error appears in the above-identified patent and that said Letters Patent is hereby corrected as shown below:

Title page,
[56], References Cited, add the following references:

| | | |
|---|---|---|
| 4,182,977 | 11/1980 | Stricklin, Jr. |
| 57171854 | 10/1982 | Europe |
| 62-296574 | 12/1987 | Japan |
| 03-126273 | 05/1991 | Japan |
| 05-315686 | 11/1993 | Japan |
| 06-139607 | 05/1994 | Japan |

PATENT ABSTRACTS OF JAPAN, Vol. 007, No. 013 (E-153), January 19, 1983 & JP57 171854 A (Nippon Denki KK), October 22, 1982.

PATENT ABSTRACTS OF JAPAN, Vol. 007, No. 008 (E-170), April 12, 1983 &JP 58 014584 A (Ricoh KK), January 27, 1983.

PATENT ABSTRACTS OF JAPAN, Vol. 008, No. 029 (E-226), February 7, 1984 & JP 58 190085 A (Fujitsu KK), November 5, 1983.

PATENT ABSTRACTS OF JAPAN, Vol. 008, no. 139 (E-253), June 28, 1984 &JP 59 050586 A (Nihon Kougaku Kogyo KK)March 23, 1984.

Signed and Sealed this

Fourteenth Day of August, 2001

*Attest:*

NICHOLAS P. GODICI
*Attesting Officer*     Acting Director of the United States Patent and Trademark Office